Patented Feb. 21, 1939

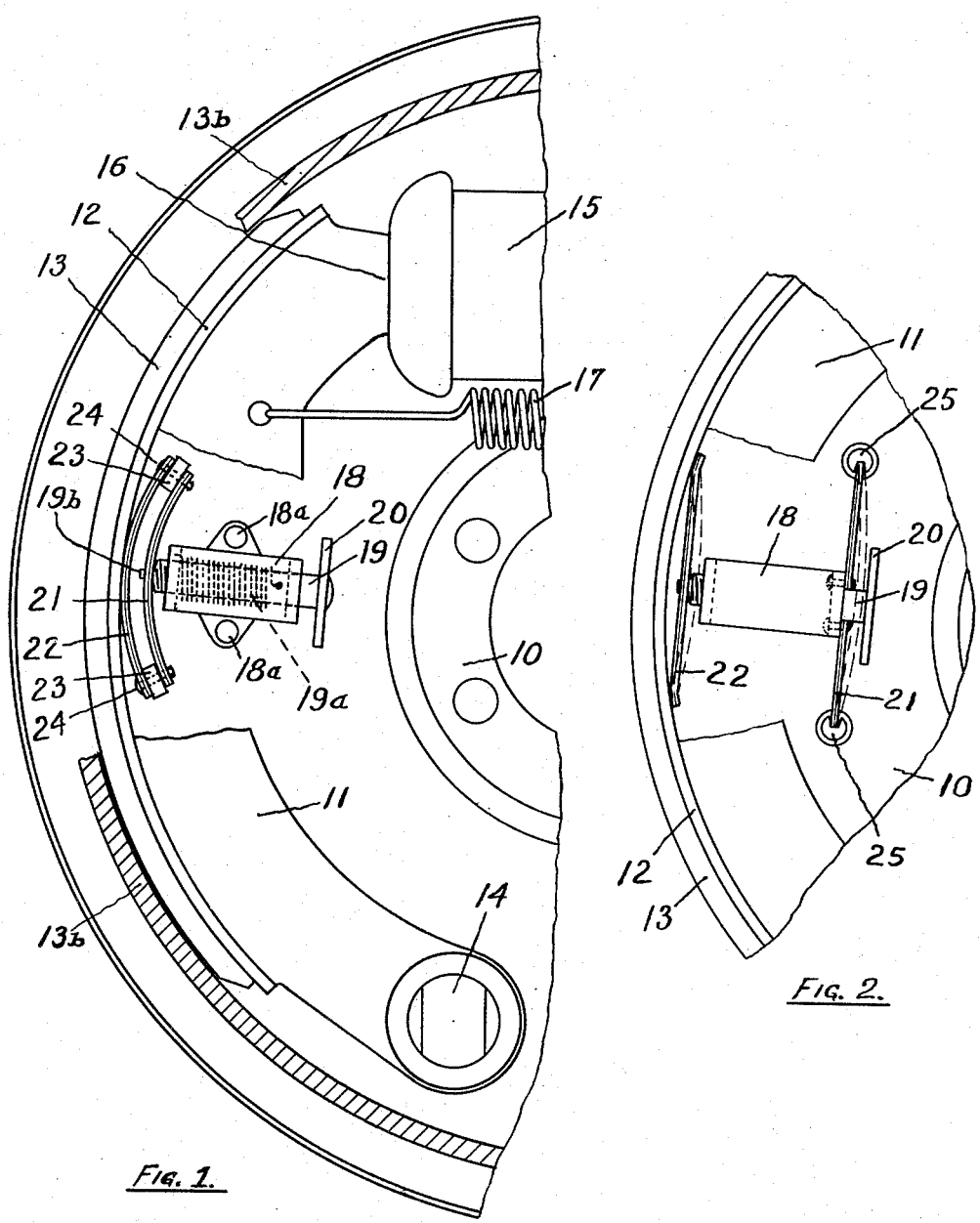

2,147,996

UNITED STATES PATENT OFFICE 2,147,996

TEMPERATURE COMPENSATOR FOR BRAKE ADJUSTERS

George L. Smith, Washington, D. C., assignor to Thermo Brakes Corporation, Washington, D. C., a corporation of Virginia Application June 27, 1938, Serial No. 216,097

5 Claims. (Cl. 188—79.5)

My invention relates to brakes for motor vehicles and especially to the adjustment thereof. In addition to the provision of a thermostatically controlled adjuster as fully described and set forth in my application Ser. No. 181,243 filed Dec. 22, 1937, "Clearance adjuster for brakes", I show in this application thermostatic means which will not be affected in its operation by seasonal changes in atmospheric temperature. Such difference in temperature may vary from 0° in cold climates in winter, to 140° in summer. Should an operator drive a car from Canada to Florida in the winter, for instance, the sudden change in temperature would seriously affect the action of any clearance adjusters on his brakes equipped with thermostatic control unless some device were applied to neutralize the effect of large variations in atmospheric temperature, and it is the object of this invention to provide such a device that will render these changes of temperature of no effect upon the adjusting mechanism.

In the drawing shown to illustrate my invention wherein like characters of reference denote corresponding parts in the different views,—

Fig. 1 shows a side elevation of a portion of a brake assembly with most of the brake drum cut away and with my adjuster applied thereto.

Fig. 2 shows a portion of the same view with a modified arrangement of adjuster parts.

Referring to the drawing the numeral 10 represents the brake support plate upon which the brake shoe 11 is mounted. The lower end of this shoe is pivoted at 14 to the support plate and upon its flange 12 the brake lining 13 is secured for frictional contact with the brake drum 13b. The usual hydraulic brake cylinder 15 is carried by the plate 10 and has operative connection with the upper end of shoe 11 by means of the web extension 16. The usual release spring 17 for releasing the brake is also shown, all in the well known manner of hydraulic brake construction.

I secure my adjuster box 18 to the plate 10 by screws or rivets 18a and this box carries the bolt 19 threaded at its left end to the box and carrying an operating wheel 20 at its right end. A torsion spring 19a surrounds the bolt and is connected to the bolt and to the box in such a manner that it will screw the bolt home until stopped by the wheel 20 hitting the end of the box.

Upon the tit 19b on left end of the bolt 19 I pivotally mount a bi-metal strip 21 with its convex side the high-expansion side. To this strip I secure a second bi-metal strip 22 also having its convex side the high-expansion side, and this strip contacts the flange 12 of the shoe 11. The two bi-metal strips are spaced apart by heat insulating washers 23 and held together by rivets 24 loosely fitting the holes in strips and washers.

The mechanism operates as follows:

The torsion spring 19a keeps the bolt 19 lightly screwed up against the strip 21 and thereby forces strip 22 against flange 12. As the shoe is swung out into contact with its drum the adjuster bolt follows up this movement and when the brake is released the spring 17 swings the shoe back again by a considerable force against strip 22 thus flexing the strips 21 and 22 and providing the necessary running clearance. When the drum heats up from severe brake application heat is transmitted to the flange 12 and through it by metal to metal contact to the strip 22 and compensation for the expanded drum is effected in the same manner as described in my application aforesaid No. 181,243. Strip 21, however, does not heat up as rapidly as its heat is obtained from the air, but its curvature as well as the curvature of 22 will vary with climatic temperatures. This will affect the position of their free ends only, which have nothing to do with the action of the adjuster, as the spacing of strips 21 and 22 at the tit 19b will be substantially the same regardless of the changes in curvature of these strips resulting from changes in atmospheric temperatures.

Thus it is seen that the use of a secondary strip 21 which is largely controlled by atmospheric temperature only, produces a combination which will work in either a cold or hot climate.

Furthermore, strip 21 serves another useful purpose in preventing over-adjustment as the brakes are alternately heated up and cooled off. During a severe brake application the temperature rise in the brake drum is rapid, while the other brake parts heat up much more slowly. But when braking action ceases the drum temperature begins to drop while the temperature of the other parts is still rising and will continue to rise until the drum temperature drops to a point of equality with that of the other parts. When this point is reached the temperatures of the drum and the other parts drop together to that of the surrounding air.

Now in controlling the running clearance of the brake the strips 21 and 22 act in much the same way to vary the spacing between shoe flange 12 and tit 19b. First strip 22 begins to bulge out towards flange 12 and increases this spacing and later on strip 21 begins to increase its curvature thus reducing the action of 22. By a selection of strips of the right characteristics the temperatures of the two can be made to become equal at practically the same time that the temperature of the brake drum drops to a point of equality with the other brake parts, at which time no adjustment of the brake for drum expansion is necessary. Strip 21 thus becomes not only a compensator for changes in atmospheric temperatures but also for changes in relative temperatures of brake drum with respect to the temperature of the other brake parts.

In Fig. 2 the operation of the parts is the same except that the high expansion sides of the strips 21 and 22 are reversed and the two strips are separated by the length of the adjuster box. Strip 21 is riveted to the end of the box 18 which rests on the plate 10 but is not bolted to it. The ends of 21 are secured to plate 10 by studs 25—25. As a rise of atmospheric temperature tends to increase the pressure of the ends of 22 on the flange 12 this same rise causes the strip 21 to curve so as to move box 18 away from the flange 12 and thus ease up this pressure. The dotted lines show to an exaggerated degree, this compensating action for atmospheric temperatures. This arrangement might be found better than that shown in Fig. 1 where the character of the brake might cause strip 21 to heat up too rapidly and interfere with the normal action of strip 22 in causing the shoe to follow up the drum expansion due to heat generated by the brake, and thus maintain the running clearance of the brake substantially constant at all times.

I claim:

1. In a brake mechanism, a braking member having brake applying and releasing movements, a stop and thermosensitive means spacing said member from said stop and maintaining said spacing substantially unaffected by changes in atmospheric temperatures.

2. In a brake mechanism, the combination of a braking member, a stop limiting the released position of said member, and thermostatic means included in said stop varying the released position of said member for variations in the temperature of said mechanism caused by the generation of heat produced by braking action and maintaining said released position substantially unaffected by variations in atmospheric temperatures.

3. In a brake mechanism, a brake shoe, release mechanism for said shoe, a stop, thermostatic means between said shoe and said stop varying the released position of said shoe for variations in brake temperature caused by the generation of heat produced by brake application and a second thermostatic means maintaining the released position of said shoe substantially invariable for changes in brake temperature caused by atmospheric temperature.

4. In a brake mechanism, a brake drum, a brake shoe for applying a braking action to said drum, an adjuster for said shoe, a first thermostatic element between said shoe and adjuster bending to advance the released position of said shoe towards its drum when the drum temperature rises as a result of brake application, and a second thermostatic element bending to reverse the action of the first element as the drum temperature falls.

5. In a brake mechanism, a brake drum, a brake shoe having brake applying and releasing movements with respect to said drum and an adjuster for said shoe including a thermostatic element bending as its temperature rises to advance the released position of said shoe towards said drum and another thermostatic element bending as its temperature rises to retract said released position.

GEORGE L. SMITH.